(12) United States Patent
Wong et al.

(10) Patent No.: US 12,407,463 B2
(45) Date of Patent: *Sep. 2, 2025

(54) METHODS, COMMUNICATIONS DEVICE AND INFRASTRUCTURE EQUIPMENT

(71) Applicant: Sony Group Corporation, Tokyo (JP)

(72) Inventors: Shin Horng Wong, Basingstoke (GB); Martin Warwick Beale, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,848

(22) Filed: Feb. 12, 2024

(65) Prior Publication Data

US 2024/0187165 A1  Jun. 6, 2024

Related U.S. Application Data

(63) Continuation of application No. 17/435,393, filed as application No. PCT/EP2020/051192 on Jan. 17, 2020, now Pat. No. 11,902,196.

(30) Foreign Application Priority Data

Mar. 29, 2019 (EP) ..................................... 19166416

(51) Int. Cl.
*H04L 5/00* (2006.01)
*H04W 52/14* (2009.01)

(52) U.S. Cl.
CPC ......... *H04L 5/0048* (2013.01); *H04W 52/146* (2013.01)

(58) Field of Classification Search
CPC ..... H04L 5/0048; H04L 5/005; H04L 5/0055; H04L 5/0053; H04W 52/146
See application file for complete search history.

(56) References Cited

U.S. PATENT DOCUMENTS

| 2018/0227047 A1* | 8/2018 | Hosseini | H04B 7/26 |
| 2020/0007302 A1* | 1/2020 | Manolakos | H04L 27/2613 |
| 2022/0312445 A1* | 9/2022 | Yin | H04L 1/1664 |

FOREIGN PATENT DOCUMENTS

| WO | 2018/050431 A1 | 3/2018 |
| WO | 2018/228865 A1 | 12/2018 |

OTHER PUBLICATIONS

ZTE, "On inter-UE Multiplexing Between eMBB and URLLC", 3GPP TSG RAN WG1 Meeting #94, R1-1808212, Aug. 20-24, 2018, 6 pages (Year: 2018).*

(Continued)

*Primary Examiner* — John J Lee
(74) *Attorney, Agent, or Firm* — XSENSUS, LLP

(57) ABSTRACT

A method of operating a communications device for transmitting data to or receiving data from an infrastructure equipment forming part of a wireless communications network. The method comprises determining uplink communications resources of a wireless access interface provided by the wireless communications network to be used for the transmission of data by the communications device to the infrastructure equipment, receiving, from the infrastructure equipment via the wireless radio interface, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator, and adjusting one or more communications parameters (Continued)

for the transmission of signals representing the data in the uplink communications resources in response to receiving the uplink pre-emption indicator.

20 Claims, 8 Drawing Sheets

(56) References Cited

OTHER PUBLICATIONS

International Search Report and Written Opinion mailed on Mar. 20, 2020, received for International Patent Application No. PCT/EP2020/051192, Filed on Jan. 17, 2020, 10 pages.
Holma et al., "LTE for UMTS OFDMA and SC-FDMA Based Radio Access", John Wiley & Sons, 2009, pp. 25-27.
3GPP, "NR; NR and NG-RAN Overall Description; Stage 2 (Release 15)", 3GPP TS 38.300 V15.2.0, Jun. 2018, pp. 1-87.
3GPP, "NR; Multiplexing and Channel Coding (Release 15)", 3GPP TS 38.212 V15.4.0, Dec. 2018, pp. 1-100.
Sony, "UL Inter-UE Pre-Emption", 3GPP TSG RAN WG1 Meeting #94, R1-1808344, Aug. 20-24, 2018, 4 pages.
Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.
3GPP, "NR; Multiplexing and Channel Coding (Release 15)", 3GPP TS 38.212 V15.3.0, Sep. 2018, pp. 1-99.
3GPP, "Study on Physical Layer Enhancements for NR Ultra-Reliable and Low Latency Case (URLLC) (Release 16)", 3GPP TR 38.824 V1.2.0, Mar. 2019, pp. 1-84.
Zte et al., "UL Multiplexing of Transmissions With Different Reliability Requirements", 3GPP TSG RAN WG1 Meeting #92bis, R1-1803803, Apr. 16-20, 2018, pp. 1-6.
Zte, "On Inter-UE Multiplexing Between eMBB and URLLC", 3GPP TSG RAN WG1 Meeting #94, R1-1808212, Aug. 20-24, 2018, 6 pages.

\* cited by examiner

METHODS, COMMUNICATIONS DEVICE AND INFRASTRUCTURE EQUIPMENT

CROSS-REFERENCE TO RELATED APPLICATIONS

The present application is a continuation of U.S. patent application Ser. No. 17/435,393, filed Sep. 1, 2021, which is a national stage entry of International Patent Application No. PCT/EP2020/051192, filed Jan. 17, 2020, which claims priority to EP 19166416.8, filed Mar. 29, 2019, the entire contents of each are incorporated herein by reference.

BACKGROUND

Field of Disclosure

The present disclosure relates to communications devices which are configured to transmit data to infrastructure equipment in a wireless communications network, where the transmission of the data by the communications devices may be pre-empted by another transmission.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting The Internet of Things, and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems [1], as well as future iterations/releases of existing systems, to efficiently support connectivity for a wide range of devices associated with different applications and different characteristic data traffic profiles.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

As such, embodiments of the present technique can provide a method of operating a communications device for transmitting data to or receiving data from an infrastructure equipment forming part of a wireless communications network. The method comprises determining uplink communications resources of a wireless access interface provided by the wireless communications network to be used for the transmission of data by the communications device to the infrastructure equipment, receiving, from the infrastructure equipment via the wireless radio interface, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator, and adjusting one or more communications parameters for the transmission of signals representing the data in the uplink communications resources in response to receiving the uplink pre-emption indicator.

Embodiments of the present technique, which further relate to communications devices, infrastructure equipment, methods of operating infrastructure equipment and circuitry for communications devices and infrastructure equipment, allow for efficient use of communications resources in satisfying varying requirements for different data types, while reducing complexity and processing requirements for communications devices.

Respective aspects and features of the present disclosure are defined in the appended claims. It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
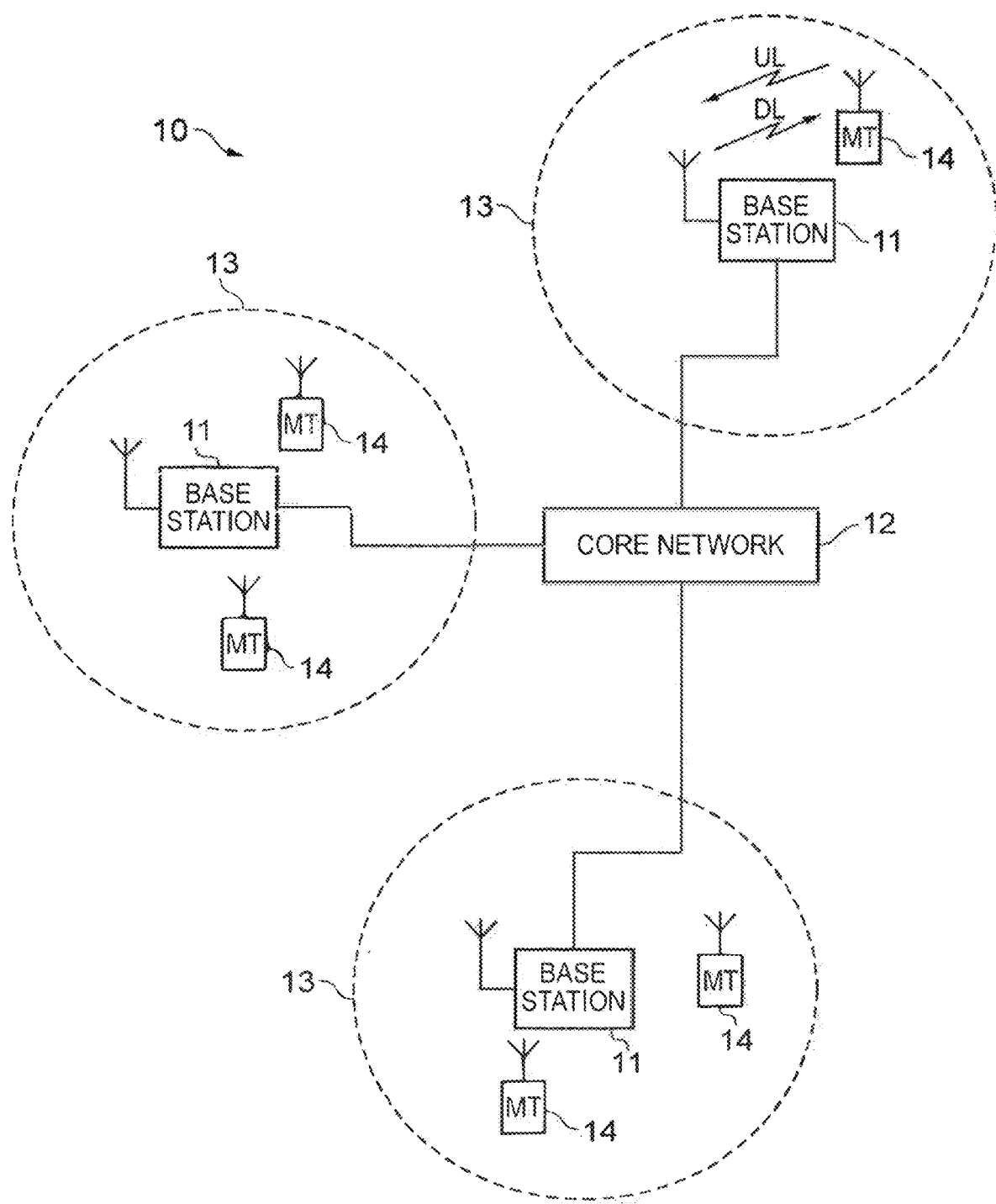
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example. Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-node Bs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (cMBB):

Massive Machine Type Communications (mMTC);

Ultra Reliable & Low Latency Communications (URLLC) [3]: and

Enhanced Ultra Reliable & Low Latency Communications (eURLLC) [4].

eMBB services are characterised by high capacity with a requirement to support up to 20 Gb/s. URLLC service requires that a packet at layer 2 is transmitted with a latency that is less than 1 ms or 0.5 ms with reliability of 99.999% to 99.9999%.

The elements of the wireless access network shown in FIG. 1 may be equally applied to a 5G new RAT configuration, except that a change in terminology may be applied as mentioned above.

Figure 2:
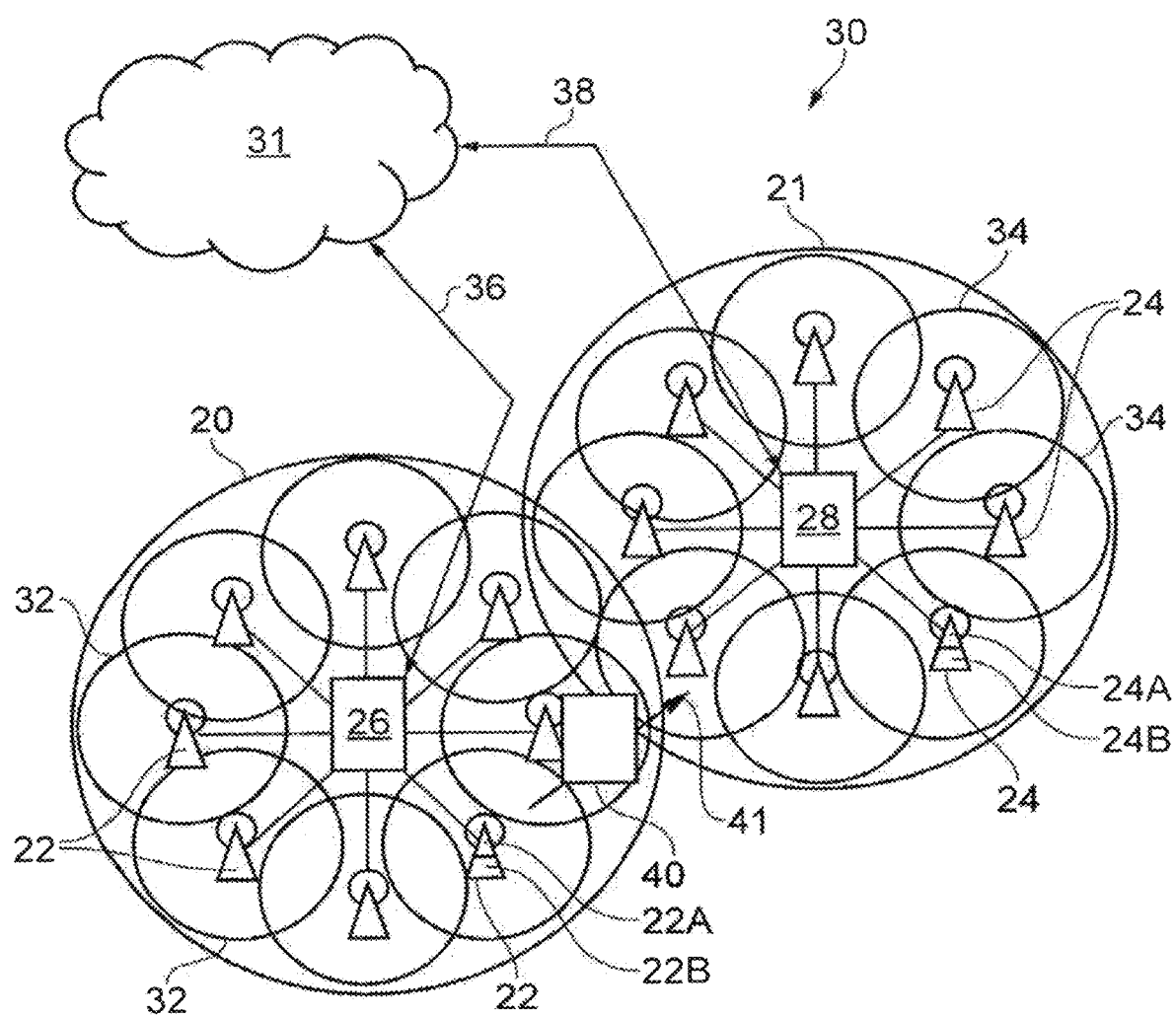
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/ remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Downlink Pre-Emption Indicator

In the mobile communications networks illustrated in FIGS. 1 and 2, transmissions may be separated in time and frequency. That is, a transmission may use a set of resources defined in terms of a time period and a frequency range, and different transmissions may use other, non-overlapping resources and may accordingly be received and decoded individually. As such, in the examples described herein, the term resources is used to refer to (jointly) time and frequency resources. However, the principles described herein may apply to other transmission schemes where a resource may refer to any portion of a range of parameters that may apply to a transmission, such that the use of the same resource for the transmission of two different pieces of information (for example, an eMBB transmission and a ULLRC transmission) is either not feasible or likely to result in severe decrease in the likelihood of successful reception of one or both. Other examples of resources may therefore include orthogonal spreading codes, orthogonal spatial transmission links, and the like. A resource may be defined in terms of a combination of multiple such parameters (as in the examples described herein, wherein a resource is characterized by time and frequency), or may refer to a single dimension (e.g. by reference solely to time).

As discussed above, a mobile communications network such as the network illustrated in FIG. 2 may be used to carry transmissions for services with a variety of constraints, such as high data rate traffic which has some tolerance to delay and traffic which has a low tolerance to delay, which may also have a lower data rate. While the principles of the disclosure will be illustrated in the context of a mobile network where a network element (e.g. TRP, eNB, BTS, . . . ) transmits eMBB and URLLC data to a terminal device, it will be appreciated that the same principles apply to 3G networks. LTE networks (such as that illustrated in FIG. 1) or any other suitable network and to any appropriate type or types of data. Likewise, the same principles and teachings can also be used for uplink transmissions from a terminal device to a network receiver (e.g. BTS, eNB. TRP, etc.) or for transmissions between peer devices.

Although the description herein relates to eMBB and URLLC (or indeed eURLLC) traffic, the disclosure is not so limited. For example, the disclosure is pertinent where the transmission data transmitted to a different device (the URLLC in embodiments) has different latency & reliability requirement to the transmission data for which the resources are initially allocated (the eMBB in embodiments) and the data transmitted to the different device uses some or all of the resources initially allocated.

A principle of eMBB data is that, in order to reduce the overhead associated with control information, the data transmission occurs over a relatively long time period (e.g. 0.5 ms, 1 ms, 5 ms, 10 ms or 50 ms), and as such the control channel associated with an eMBB transmission uses significantly smaller transmission resources than that of the data channel. In this manner, the relative overhead caused by the transmission of control information is reduced. On the other hand, in order to meet a low latency requirement associated with a URLLC transmission, the URLLC data resources may be relatively shorter, such as 0.25 ms. An example requirement currently considered for URLLC is a low latency transmission measured from the ingress of a layer 2 packet to its egress from the network, with a proposed target of 1 ms.

Since URLLC is intolerant to latency, it is agreed that URLLC can occupy (that is, be transmitted using) a subset of the resources that have been previously allocated for an eMBB transmission. Although a URLLC transmission may comprise a relatively smaller amount of data than an eMBB transmission, it may be necessary that, for example in order to meet a latency requirement, a URLLC transmission occupies a very high bandwidth for a short time period. The bandwidth (i.e. the extent of the transmission resources when measured in the frequency domain) used for a URLLC transmission may therefore exceed that of an eMBB transmission. In particular, the bandwidth used for a single URLLC transmission may span the frequency range used by two or more ongoing eMBB transmissions. As such, a particular problem arises when a single URLLC transmission uses resources allocated for two or more different cMBB transmissions. This is illustrated in FIG. 3.

Figure 3:
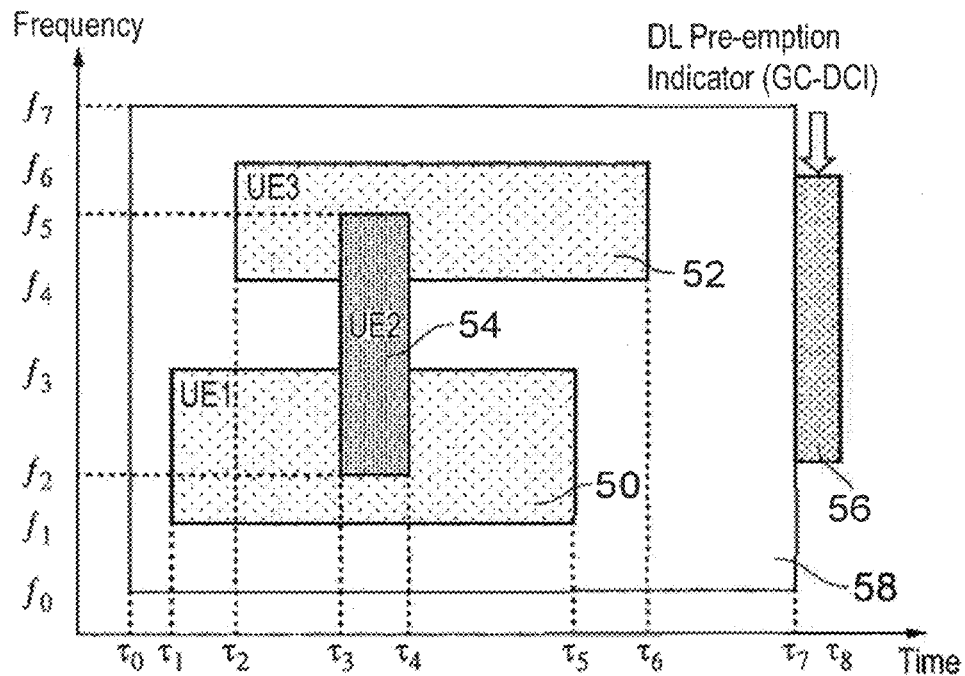
FIG. 3 shows an example of a downlink pre-emption indicator.

FIG. 3 illustrates data transmissions from a base station or gNB to terminal devices. On the horizontal axis is shown a progression of time while the vertical axis shows a frequency range. The data transmissions 50, 52 having a relatively longer time duration that are transmitted to UE1 and UE3 are examples of first and second eMBB transmissions, while the transmission 54 using a relatively larger frequency range over a shorter time period that is transmitted to UE2 is an example of a URLLC transmission. In the example shown in FIG. 3, the URLLC transmission 54 uses resources which have been allocated for the first and second eMBB transmissions 50, 52. FIG. 3 also illustrates the principle that an eMBB transmission typically occurs over a long duration but over a relatively limited frequency range while a URLLC transmission may occupy a much shorter time period but may use a much wider range of frequencies in order to meet the latency requirement of the URLLC data.

One aspect of URLLC is that the URLLC transmission (for example URLLC transmission 54) can pre-empt the resources previously allocated for another, lower priority, transmission such as eMBB data (for example eMBB transmissions 50, 52), after those resources have already been scheduled, in order to ensure that the URLLC transmission 54 is able to meet its latency requirements. However, it will be clear to the skilled person that the possibility of correctly decoding the affected eMBB transmissions 50, 52 will be negatively impacted by the fact that some portion of the resources which were allocated for their transmission has in fact been used for the transmission of the URLLC data 54. In order to assist receivers of the cMBB data transmissions 50, 52, it has been agreed in Rel-15, for downlink URLLC & cMBB operation, a downlink Pre-emption Indicator (DL PI) is used to inform the eMBB UE that some of its resources have been pre-empted by another UE's transmission. Such a DL PI was first proposed in co-pending European patent application [5], the contents of which are incorporated herein by reference.

An example of a DL PI 56 is also shown in FIG. 3, where as described above eMBB transmission 50 is transmitted to a UE. e.g. UE1, between time $\tau_1$ and $\tau_5$. At $\tau_3$, the gNB transmits URLLC transmission 54 to another UE. e.g. UE2, where this URLLC transmission 54 ends at time 14. In other words, as described above, the URLLC transmission 54 for UE2 pre-empts part of the resources that are originally scheduled for UE1's eMBB transmission 50. A downlink Pre-emption Indicator (DL PI) 56 is transmitted by the gNB at time 17 to indicate to UE1 that part of its resources have been pre-empted so that UE1 can take ameliorative steps in decoding the eMBB message 50: for example, UE1 can zero out the soft bits corresponding to the pre-empted parts.

In Rel-15 NR, the DL Pre-emption Indicator is transmitted using Downlink Control Information (DCI); specifically a Group Common DCI (GC-DCI, also known as DCI Format 2_1 in 3GPP [6]), where a GC-DCI contains control information for a group of UEs. The rationale behind using a GC-DCI is that the URLLC in the downlink is expected to occupy a wide frequency bandwidth (but a narrow period of time) and so it is likely that the URLLC will pre-empt more than one eMBB UE. For example in FIG. 3, as described above. URLLC transmission 54 transmitted to UE2 occupies frequency resource from $f_2$ to $f_5$, which would pre-empt resources 50, 52 originally scheduled for UE1 and UE3. Instead of transmitting multiple Pre-emption Indicators to UE1 and to UE3, it is deemed more efficient to transmit a single Pre-emption Indicator 56 to a group of UEs. This Pre-emption Indicator 56 just needs to indicate the resources occupied by the URLLC transmission 54. e.g. occupying time $\tau_3$ to $\tau_4$ and frequency $f_2$ to $f_5$. The UEs receiving this Pre-emption Indicator 56 will determine which resources 54 indicated by the Pre-emption Indicator 56 overlap with their most recent eMBB transmission 50, 52: for example in FIG.

3. UE1 will determine that the resources between time $\tau_3$ and $\tau_4$ and frequency $f_2$ and $f_3$ are pre-empted, whilst UE3 will determine that the resources between time $\tau_3$ and $\tau_4$ and frequency $f_4$ and $f_5$ are pre-empted.

The GC-DCI carrying the Downlink Pre-emption Indicator addresses a Reference Downlink Region (RDR). The RDR was proposed in co-pending European patent application [7], the contents of which are incorporated herein by reference. For example, in FIG. 3, an RDR 58 is defined between time $\tau_0$ and $\tau_7$ and between frequency $f_0$ to $f_1$. The Pre-emption Indicator 56 carried by the GC-DCI only indicates pre-empted resources if those pre-empted resources fall within this RDR 58 and an eMBB UE with a transmission 50, 52 that falls within the RDR 58 will read the Pre-emption Indicator 56 in the corresponding GC-DCI to determine where (if any), the pre-empted resources are. The RDR occurs periodically in time. i.e. a GC-DCI is monitored periodically, and occupies a fixed frequency region. In Rel-15 NR, the frequency region occupied by the RDR is equivalent to the Bandwidth Part (BWP) of the UEs configured to monitor the GC-DCI corresponding to that RDR. The BWP is a fraction of the system bandwidth configured by the network for a UE to operate in and the rationale for the use of BWPs is that a UE operating in a narrow bandwidth would consume less power than one operating over the whole (and much wider) system bandwidth.

Figure 4A:
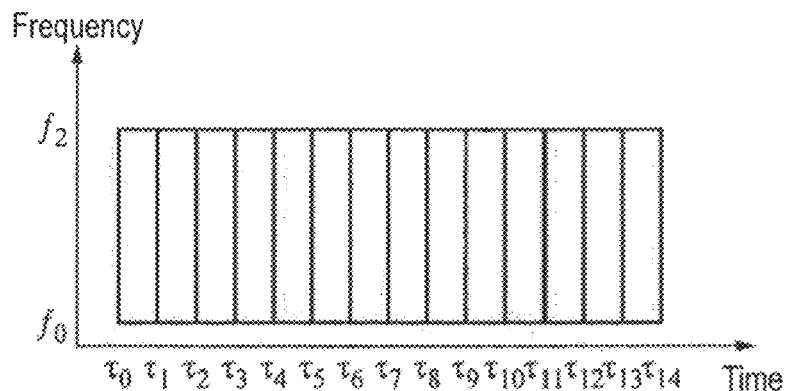
FIGS. 4A and 4B illustrate two examples of reference downlink regions addressed by a downlink pre-emption indicator.
Figure 4B:
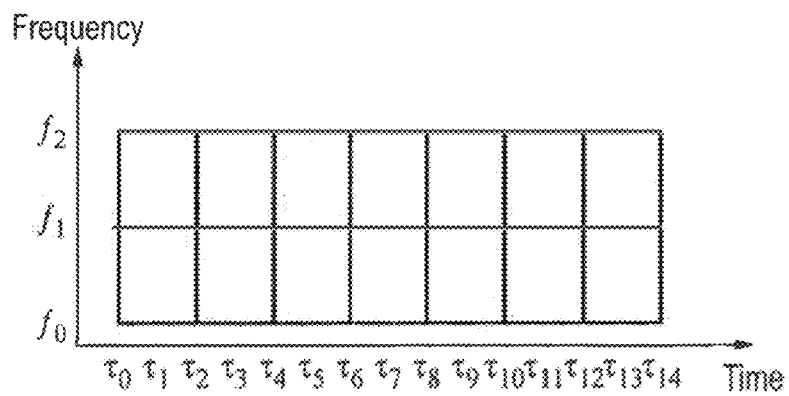

In Rel-15 NR, the number of information bits for the Downlink Pre-emption Indicator is fixed at 14 bits, where it can be RRC configured to indicate either a bitmap of 1×14 or a bitmap of 2×7, which determines how the RDR is divided into resource regions. That is, the RDR can be divided into 1 frequency region by 14 time regions or 2 frequency regions by 7 time regions. This is shown in FIGS. 4A and 4B, where an RDR is shown to occupy time $\tau_0$ to $\tau_{14}$ and frequency $f_0$ to $f_2$. The RDR resource regions grid in FIG. 4A is represented by the bitmap of dimension 1×14 and the RDR resource regions grid in FIG. 4B is represented by the configured bitmap of dimension 2×7. The bitmap will indicate which resource region(s) is pre-empted. The Downlink Pre-emption Indicator indicates which of these regions are pre-empted by another (URLLC) UE.

Uplink Pre-Emption Indicator

Figure 5:
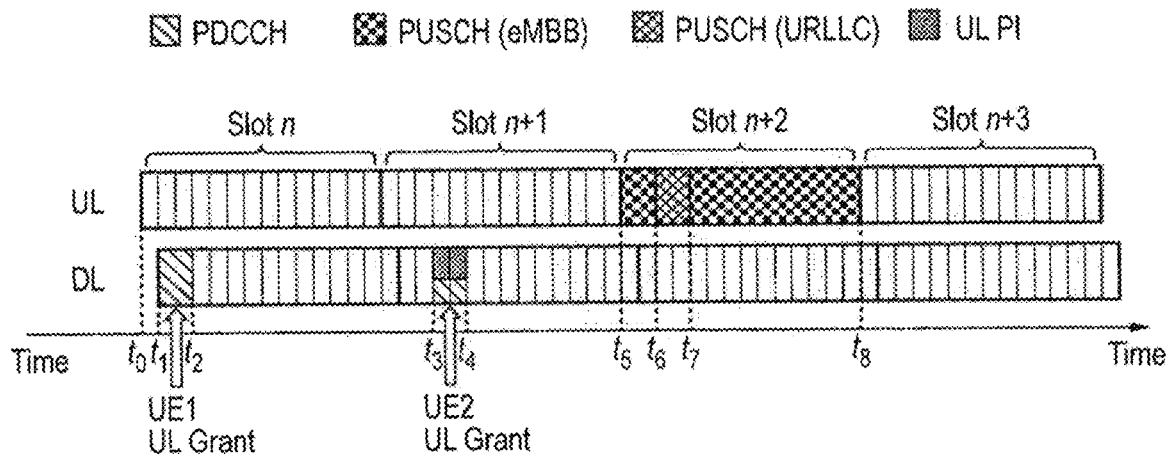
FIG. 5 shows an example of an uplink pre-emption indicator.

One of the features considered for Rel-16 cURLLC is Uplink Pre-emption Indicator (UL PI). Similar to the DL PI, it is used to manage an URLLC PUSCH transmission pre-empting a scheduled cMBB PUSCH transmission. An example is shown in FIG. 5, where UE1 with eMBB traffic, receives an UL grant at time $t_1$ for a PUSCH transmission starting at time 15 occupying the entire slot n+2. At time $t_3$ UE2, with UL URLLC traffic, receives an UL grant for a PUSCH transmission at time 16 occupying 2 symbols, where this transmission uses some of the resources originally scheduled for UE1. In order to ensure the reliability of UE2's URLLC PUSCH transmission, the gNB transmits an UL PI to UE1 at time $t_3$, indicating that its transmission has been pre-empted and that it should stop its PUSCH transmission at least for the time where the pre-emption occurs so that it does not introduce any interference to UE2. It should be noted that unlike the downlink where the DL PI is transmitted after the pre-emption occurs, in the uplink the UL PI is transmitted before the pre-emption occurs so that the victim eMBB UE. e.g. UE1, would stop its PUSCH transmission.

Figure 6:
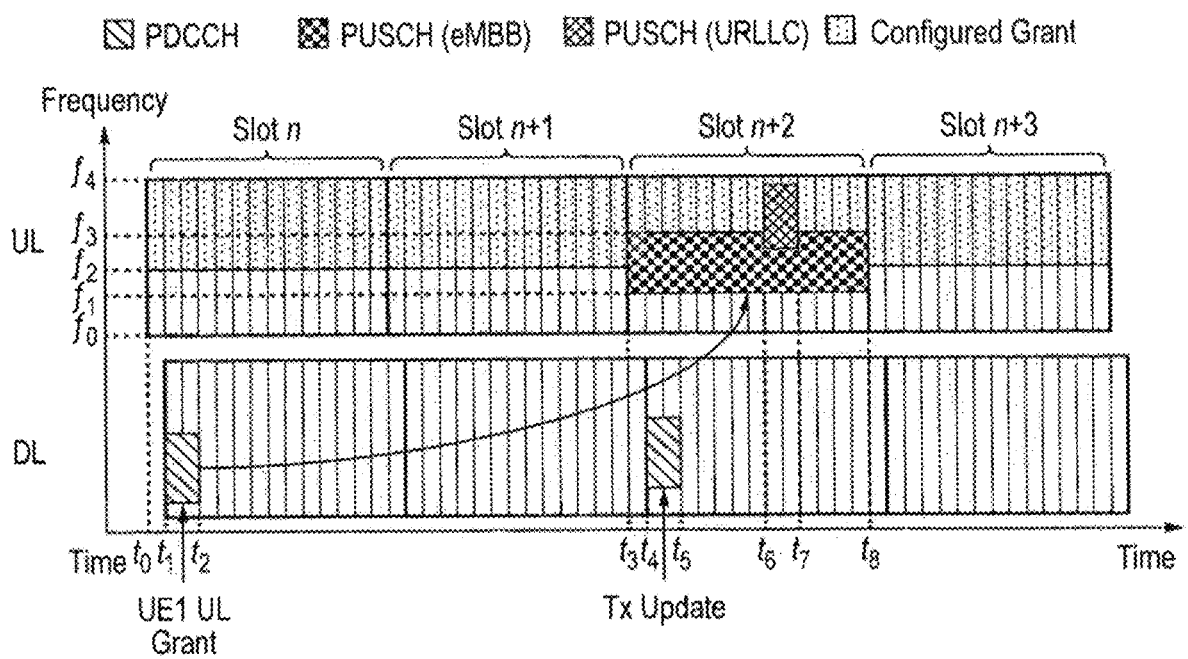
FIG. 6 shows an example of a situation where an Enhanced Mobile Broadband (eMBB) transmission may occupy configured grant resources.

The UL PI is originally proposed for dynamic grant or grant based PUSCH transmission, that is, the PUSCH is scheduled by an UL grant carried by a DCI. However, in addition to dynamic grant PUSCH, the PUSCH can also be transmitted using configured grant or grant free transmission, where the UE is pre-configured with a set of uplink resources where it can transmit a PUSCH whenever it wants. Configured grant reduces latency since the UE does not need to transmit a Scheduling Request to request for PUSCH resources and wait for an UL grant in order to transmit data, which suits the low latency requirement of URLLC traffic. Since URLLC traffic can be sporadic and does not use the configured grant resource continuously, it is not efficient to reserve these resources exclusively for a URLLC UE. To make efficient use of the resource, the gNB may schedule eMBB traffic that occupies some of the resources for configured grant, which may cause interference to a URLLC transmission if it uses the configured grant resources at the same time. An example of this is shown in FIG. 6, where the gNB provides configured grant resources for UE2 that occupy frequency $f_2$ to $f_4$ for every slot. At time $t_1$ UE1, with eMBB traffic, receives an UL grant for PUSCH which occupies frequency $f_1$ to $f_3$ and the entire slot n+2, thereby overlapping some of the configured grant resources for UE2. In this example UE2 with URLLC decides to transmit a PUSCH using the configured grant at time $t_6$ to $t_7$ in slot n+2, which gets interference from UE1's PUSCH transmission.

For the dynamic grant URLLC case, since the gNB is aware of both the URLLC and eMBB transmission, the UL PI is targeted at the eMBB UE to stop its transmission thereby removing the interference from the URLLC transmission. However, for the configured grant URLLC case, the gNB is not aware when the URLLC PUSCH will be transmitted and hence would not know when to stop the scheduled eMBB PUSCH transmission. Recognising this, it is proposed by the inventors of the present disclosure in [8] that a transmission parameter update is transmitted to the URLLC UE with configured grant indicating the changes to the configured grant resources to avoid the interference from eMBB transmission. For example, referring to FIG. 6 again, here a transmission parameter update (TX update) is sent to UE2 at the start of slot n+2 where the UE1's eMBB PUSCH transmission occupies some of the configured grant resources. The transmission parameter update can indicate that the configured grant frequency resource is updated to be between $f_3$ and $f_4$ and hence any URLLC transmission by UE2 using configured grant in slot n+2 would avoid interference from UE1. The transmission parameter update can be monitored on a per slot basis and is applicable for that slot.

It is desirable that a single solution, such as an UL PI, is used for both dynamic grant and configured grant. Embodiments of the present technique propose how this may be achieved.

Reference Region for Uplink Pre-Emption Indicator

Figure 7:
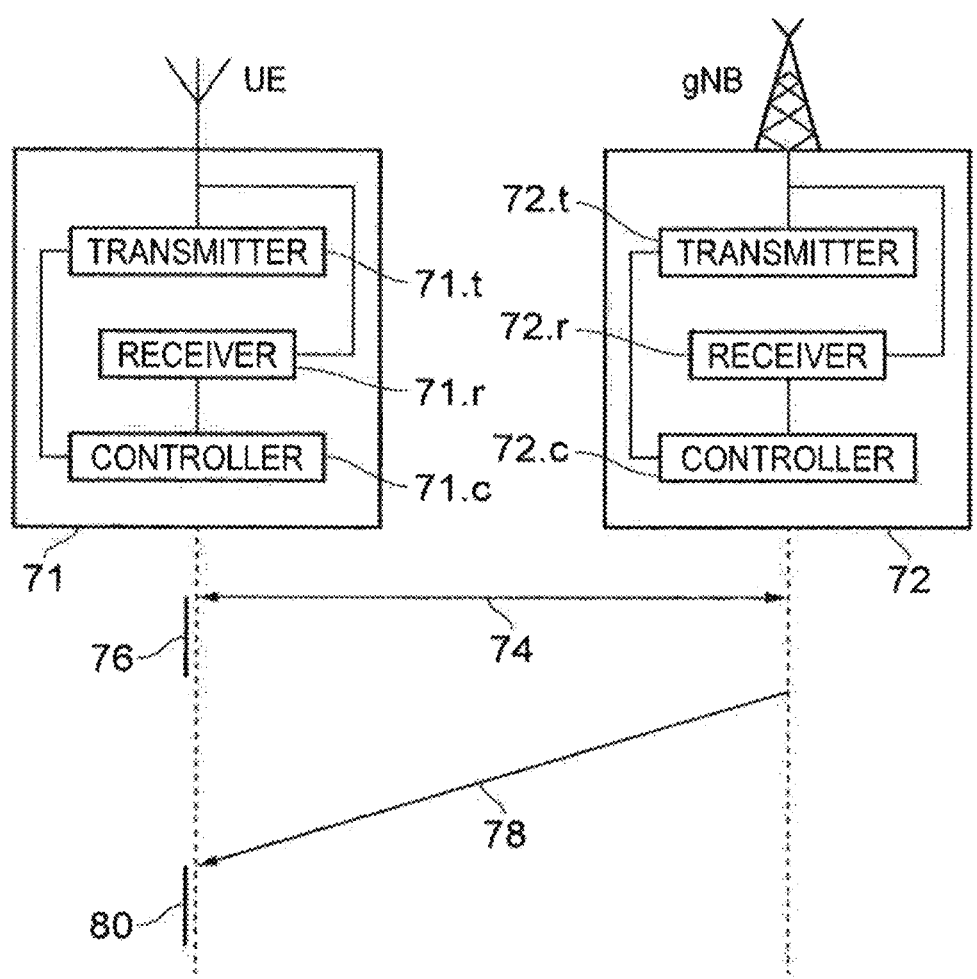
FIG. 7 is a part schematic representation, part message flow diagram of communications between a communications device and an infrastructure equipment of a wireless communications network in accordance with embodiments of the present technique.

FIG. 7 provides a part schematic representation, part message flow diagram of communications between a communications device or UE 71 and an infrastructure equipment or gNodeB 72 of a wireless communications network in accordance with embodiments of the present technique. The communications device 71 comprises a transmitter (or transmitter circuitry) 71.t configured to transmit signals to the infrastructure equipment 72 via a wireless access interface 74 provided by the wireless communications network, a receiver (or receiver circuitry) 71.r configured to receive signals from the infrastructure equipment 72 via the wireless access interface 74, and a controller (or controller circuitry) 71.c configured to control the transmitter circuitry 71.t and the receiver circuitry 71.r to transmit or to receive the signals. As can be seen in FIG. 7, the infrastructure equipment 72 also comprises a transmitter (or transmitter circuitry) 72.*t* configured to transmit signals to the communications device 71 (which may be one of a plurality of communications devices) via the wireless access interface 74, a receiver (or receiver circuitry) 72.*r* configured to receive signals from the communications device 71 via the wireless access interface 74, and a controller (or controller circuitry) 72.*c* configured to control the transmitter circuitry 72.*t* and the receiver circuitry 72.*r* to transmit or to receive the signals representing data. Each of the controllers 71.*c*. 72.*c* may be, for example, a microprocessor, a CPU, or a dedicated chipset, etc.

The controller circuitry 71.*c* of the communications device 71 is configured in combination with the receiver circuitry 71.*r* and the transmitter circuitry 71.*t* of the communications device 71 to determine 76 uplink communications resources of the wireless access interface 74 to be used for the transmission of data by the communications device 71 to the infrastructure equipment 72, to receive 78, from the infrastructure equipment 72 via the wireless radio interface 74, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator, and to adjust 80 one or more communications parameters for the transmission of signals representing the data in the uplink communications resources in response to receiving the uplink pre-emption indicator Essentially, embodiments of the present technique propose that an UL PI be used, where in some arrangements, the reference region of the UL PI depends on whether it targets a dynamic grant or a configured grant transmission. Here, in other words, the communications device is configured to determine the communications resources of the reference region of the uplink pre-emption indicator based on a manner in which the uplink communications resources are allocated to the communications device. The manner in which the uplink communications resources are allocated to the communications device may comprise the communications device determining that the uplink communications resources are pre-configured for use by the communications device for the transmission of the data. Alternatively, the manner in which the uplink communications resources are allocated to the communications device may comprise the communications device receiving an uplink grant comprising an allocation of the uplink communications resources from the infrastructure equipment. Hence, the same UL PI can be configured for use in both types of PUSCH grants, thereby allowing a single solution for both types of PUSCHs.

In some arrangements of embodiments of the present technique, the reference region for the UL PI may be divided into a grid, for example a 1×14 grid, or a 2×7 grid, or any other grid. Those skilled in the art would understand that this is a similar structure to that used in DL PI, but must be confined within the resources of the configured grant. In some arrangements, the UL PI consists of a bitmap where each bit represents a section in the said grid. In other words, the uplink pre-emption indicator comprises a bitmap comprising one or more bits each representing a portion of the communications resources of the reference region, wherein a value of each of the one or more bits indicates whether or not the portion of the communications resources of the reference region associated with that bit is within the at least the portion of the uplink communications resources that are allocated for the transmission of signals by the other communications device. In other arrangements, the grid consists of only 1 bit. i.e. the entire reference region is either pre-empted or not. In other words, the uplink pre-emption indicator comprises a bitmap comprising a single bit representing all of the communications resources of the reference region, wherein a value of the single bit indicates whether or not the at least the portion of the uplink communications resources that are allocated for the transmission of signals by the other communications device is within the communications resources of the reference region.

Hence, using the above described grid/bitmap format for the reference region of the UL PI, it is possible to use the same UL PI construction for both of the scenarios:

When the UL PI targets a configured grant PUSCH, it is the URLLC UE that is monitoring this UL PI and the behaviour of the UE is to avoid or increase transmission power for regions that are pre-empted by an eMBB UE. The regions in the configured grant that collide with an cMBB PUSCH are indicated in the bitmap representing the grid in the UL PI; and When the UL PI targets a dynamic grant PUSCH, it is the eMBB UE that is monitoring this UL PI and the behaviour of the UE is to cancel the PUSCH or stop transmitting in regions that are pre-empted by the URLLC UE. The regions that are pre-empted by a URLLC PUSCH are indicated in the bitmap representing the grid in the UL PI.

In other words, the UL PI may target a configured grant PUSCH, and hence the communications device is configured to determine that the uplink communications resources are pre-configured for use by the communications device for the transmission of the data. Here, the adjusting one or more communications parameters may comprise only transmitting the signals representing the data in the uplink communications resources other than the at least the portion of the uplink communications resources and/or increasing a transmission power for transmitting the signals representing the data in the at least the portion of the uplink communications resources. Alternatively the UL PI may target a dynamic grant PUSCH, and hence the communications device is configured to receive an uplink grant (e.g. in DCI) comprising an allocation of the uplink communications resources from the infrastructure equipment. Here, the adjusting one or more communications parameters may comprise only transmitting the signals representing the data in the uplink communications resources other than the at least the portion of the uplink communications resources and/or cancelling the transmission of the signals representing the data in the uplink communications resources. Should the communications device cancel the transmission of the signals representing the data in the uplink communications resources, then it may be configured, subsequent to cancelling the transmission of the signals representing the data in the uplink communications resources, to receive a second uplink grant from the infrastructure equipment comprising an allocation of new uplink communications resources of the wireless access interface to be used for the transmission of the data. The reception of new resources may be subsequent to a request for their acquisition transmitted from the communications device to the infrastructure equipment.

In some arrangements of embodiments of the present technique, when the UL PI targets a configured grant PUSCH (i.e. a UE pre-configured with PUSCH grant free resource that is also configured to monitor the said UL PI) the frequency domain of the reference region may be equal to the frequency resource of the configured grant. In other words, a contiguous range of frequencies which define the communications resources of the reference region are the same as a contiguous range of frequencies which define the uplink communications resources. This is also applicable if frequency hopping is used in the configured grant, that is, the reference region follows the frequency hopping sequence.

In some arrangements of embodiments of the present technique, when the UL PI targets a configured grant PUSCH (i.e. a UE pre-configured with PUSCH grant free resource that is also configured to monitor the said UL PI) the time domain of the reference region may be equal to the periodicity of the UL PI monitoring occasion. Those skilled in the art would note that a UL PI may or may not be transmitted to the UE depending on whether there is an actual pre-emption, and hence the term "monitoring occasion" is used to describe the periodicity of the UL PI. In other words, a continuous time period which defines the communications resources of the reference region is the same as a continuous time period between periodic uplink pre-emption indicator monitoring occasions of the wireless access interface within which the communications device monitors for an uplink pre-emption indicator from the infrastructure equipment.

Figure 8:
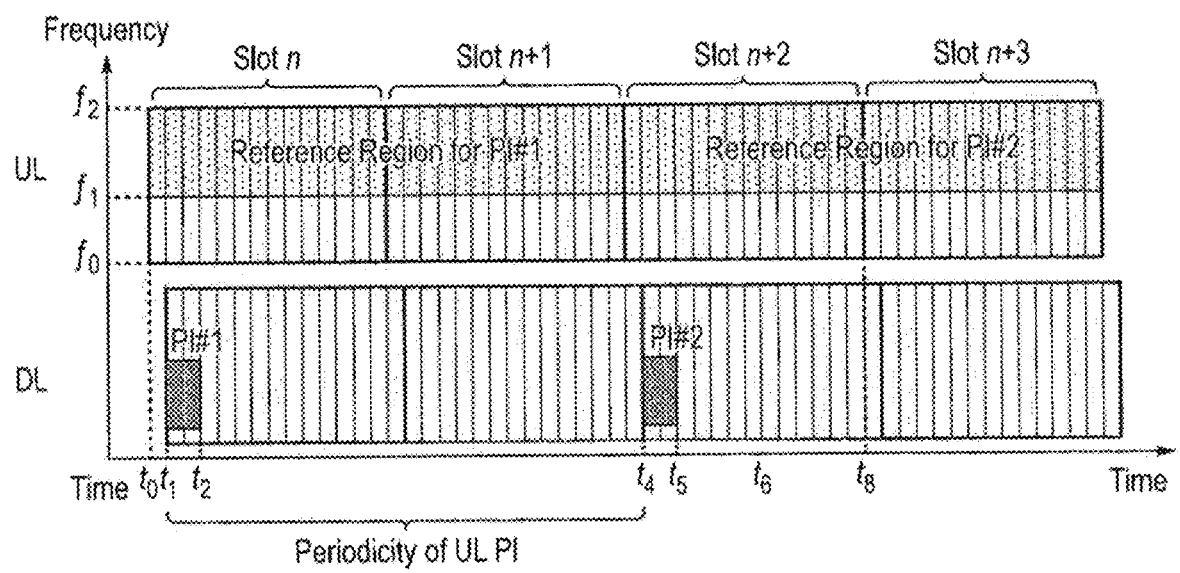
FIG. 8 shows a first example of a reference region for an uplink pre-emption indicator targeting a configured grant physical uplink shared channel (PUSCH) in accordance with embodiments of the present technique.

An example encompassing the above two arrangements, of the frequency domain of the reference region being equal to the frequency resource of the configured grant and the time domain of the reference region being equal to the periodicity of the UL PI monitoring occasion, is shown in FIG. 8. In FIG. 8, grant free PUSCH resources (i.e. configured grant) are configured for a URLLC UE. In the frequency domain, the grant free resource occupies frequency $f_1$ to $f_2$ and in the time domain it occurs in every slot. In order to handle multiplexing of dynamic grant PUSCH such as for eMBB traffic and configured grant PUSCH for URLLC traffic, the gNB configures the URLLC UE to monitor UL PI with a periodicity of 2 slots. Hence, using these above-described two arrangements, the reference region of the configured UL PI in the frequency domain ranges from $f_1$ to $f_2$ and in the time domain occupies two slots.

Figure 9:
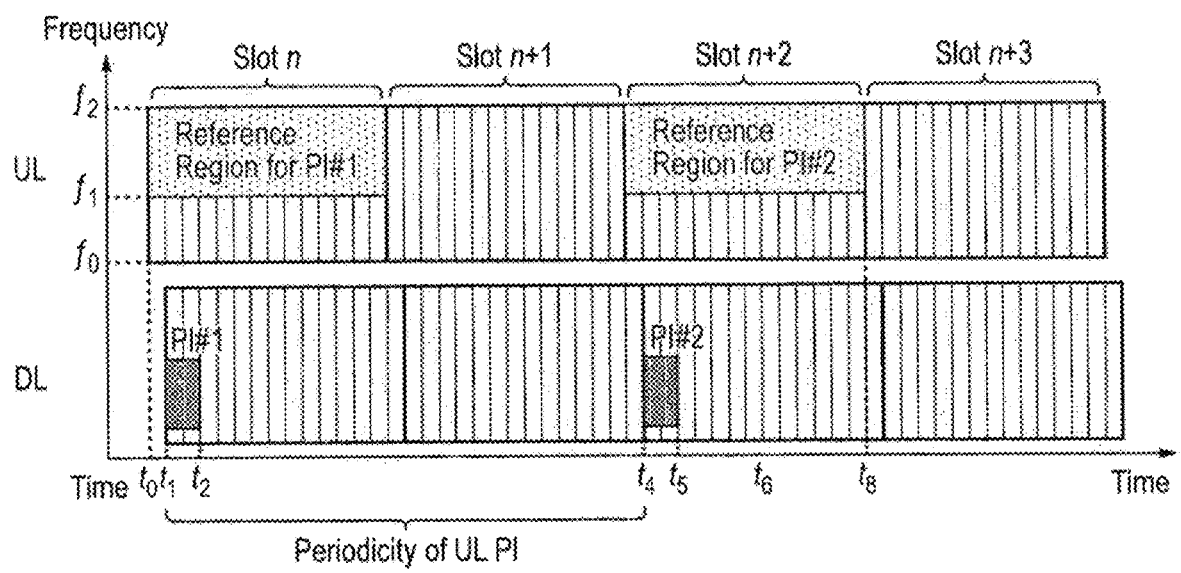
FIG. 9 shows a second example of a reference region for an uplink pre-emption indicator targeting a PUSCH in accordance with embodiments of the present technique.

In another arrangement of embodiments of the present technique, the time domain of the reference region of a UL PI targeting a configured grant PUSCH may be equal to the duration of the configured grant. In other words, a continuous time period which defines the communications resources of the reference region is the same as a continuous time period which defines the uplink communications resources. The configured grant may not occur all the time and there may be time gaps between two occurrences of a configured grant, which are defined by the duration and periodicity of the configured grant. An example of this is shown in FIG. 9, where the configured grant for a (URLLC) UE has a duration of one slot and a periodicity of 2 slots thereby giving a 1 slot gap in between two configured grant resources. The UL PI monitoring occasion is configured to have a periodicity of 2 slots. By setting the time domain of the reference region to the duration of the configured grant resource avoids the reference region from covering these gaps which would never face collisions with eMBB PUSCH (since the configured grant resource does not exist there).

In another arrangement of embodiments of the present technique, the UL PI monitoring occasion may be at the start of the associated reference region. In other words, each of the uplink pre-emption indicator monitoring occasions are located at the start of the reference region associated with the uplink pre-emption indicator that the communications device monitors for in that uplink pre-emption indicator monitoring occasion. Using FIG. 9 as an example, the reference region occupying slot n is associated to the 1$^{st}$ UL PI monitoring occasion which is labelled as PI #1 occurs in the same slot, i.e. slot n where the UL PI monitoring occasion is located at the start of the reference region.

Figure 10:
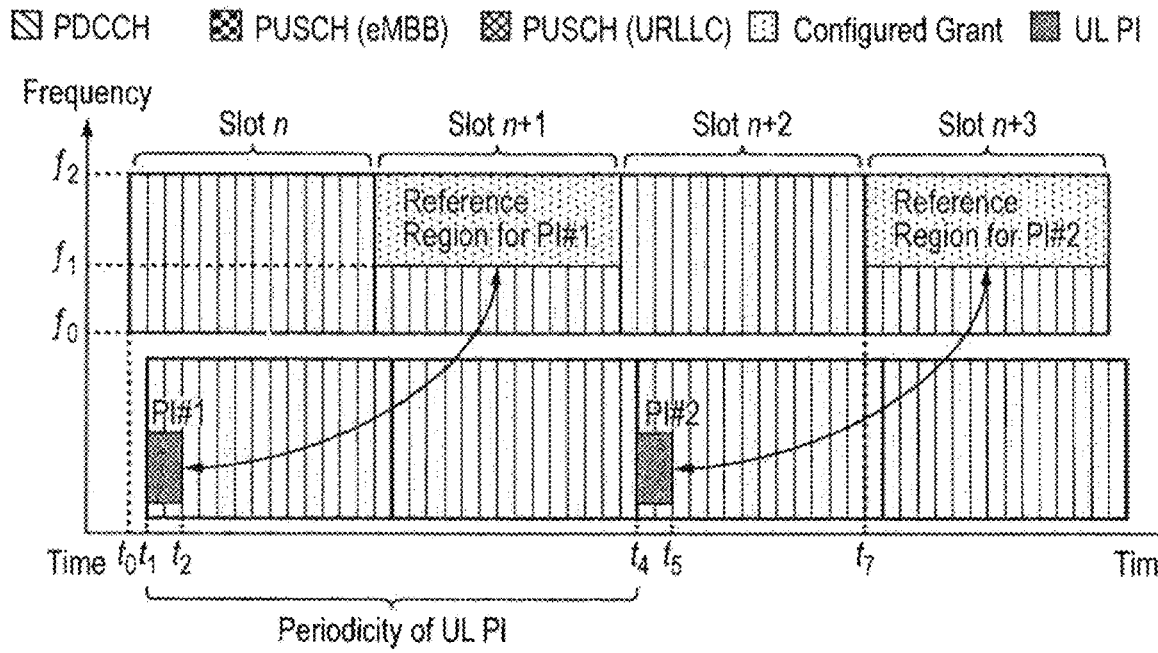
FIG. 10 illustrates an example in which an uplink pre-emption monitoring occasion may occur before the associated reference region in accordance with embodiments of the present technique.

In another arrangement of embodiments of the present technique, the UL PI monitoring occasion may be located before the start of the associated reference region. In other words, each of the uplink pre-emption indicator monitoring occasions are located before the start of the reference region associated with the uplink pre-emption indicator that the communications device monitors for in that uplink pre-emption indicator monitoring occasion. This arrangement recognises that the URLLC UE would require time to process the PUSCH using the configured grant and hence it needs to know whether there is a pre-emption before such processing. An example is shown in FIG. 10, where the configured grant has a duration of 1 slot and periodicity of 2 slots whilst the UL PI monitoring occasion has a periodicity of 2 slots. The UL PI monitoring occasion occurs 1 slot prior to its associated reference region.

Figure 11:
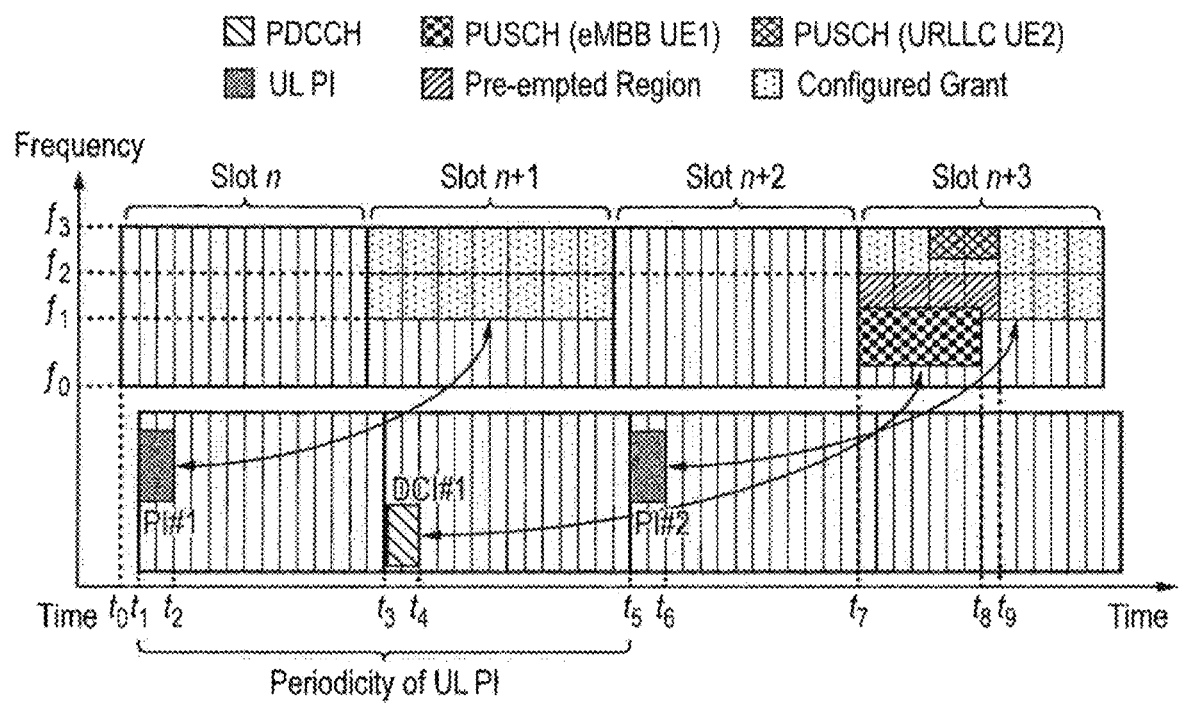
FIG. 11 illustrates an example of how an uplink pre-emption indicator may be used for a UE to transmit Ultra Reliable and Low Latency Communications (URLLC) data in a configured grant PUSCH in accordance with embodiments of the present technique

An example implementation of the above arrangements, relating to the location of the UL PI monitoring occasions, is shown in FIG. 11, where UE2 is configured with grant free PUSCH (i.e. configured grant) resources on frequency $f_1$ to $f_3$ with a duration of 1 slot and periodicity of 2 slots. UE2 is also configured with UL PI with a periodicity of 2 slots where the UL PI contains a 14 bit bitmap representing a 2×7 grid. Since this UL PI is targeted at configured grant, as per the previous described arrangements, the reference region is projected onto the configured grant resources thereby dividing the configured grant resources into 2 frequency parts and 7 time periods. At time $t_3$, the gNB sends an UL grant to schedule UE1 with PUSCH transmission in slot n+3 for its eMBB traffic where this PUSCH overlaps the configured grant for UE2 in slot n+3 between time $t_7$ and $t_8$. Since the gNB is aware of this overlap, it indicates this overlap using the UL PI at time Is indicating the lower left 4 parts of the 2×7 grid (i.e. from $t_7$ to $t_9$ and frequency $f_1$ to $f_2$) as being pre-empted or occupied. Hence UE2 using the configured grant in slot n+3 would avoid these indicated parts or use a higher transmission power if it needs to use these parts. It should be noted that the parts indicated as being pre-empted are larger than the actual pre-emption due to the granularity of the grids in the reference region.

In another arrangement of embodiments of the present technique, a DCI can be configured to carry multiple UL PIs targeting multiple configured grants. In other words, the communications device is configured to receive the uplink pre-emption indicator in downlink control information received from the infrastructure equipment, the downlink control information comprising one or more other uplink pre-emption indicators. For example, this DCI can be a GC-DCI targeting multiple UEs where each UE can be associated with one or more configured grant resources. In other words, the downlink control information is transmitted to one or more other communications devices in addition to the communications device, and each of the other uplink pre-emption indicators are for receipt by one of the other communications devices (or indeed, one or more of the other pre-emption indicators are for receipt by the communications device as well as or instead of each of the other communications devices). It can also be UE specific where the UE is configured with multiple configured grants. In other words, one or more of the other uplink pre-emption indicators are for receipt by the communications device and each of the one or more of the other uplink pre-emption indicators indicate that at least a portion of the uplink communications resources are allocated for the transmission of a signal (this may be a different signal for each UL PI) by one of one or more other communications devices (this may be a different UL PI for each other communications device), the at least the portion of the uplink communications resources being located within communications resources of a reference region associated with each of the one or more of the other uplink pre-emption indicators. Here the DCI consists of multiple bitmaps, where each bitmap maps to a different configured grant resource.

Figure 12:
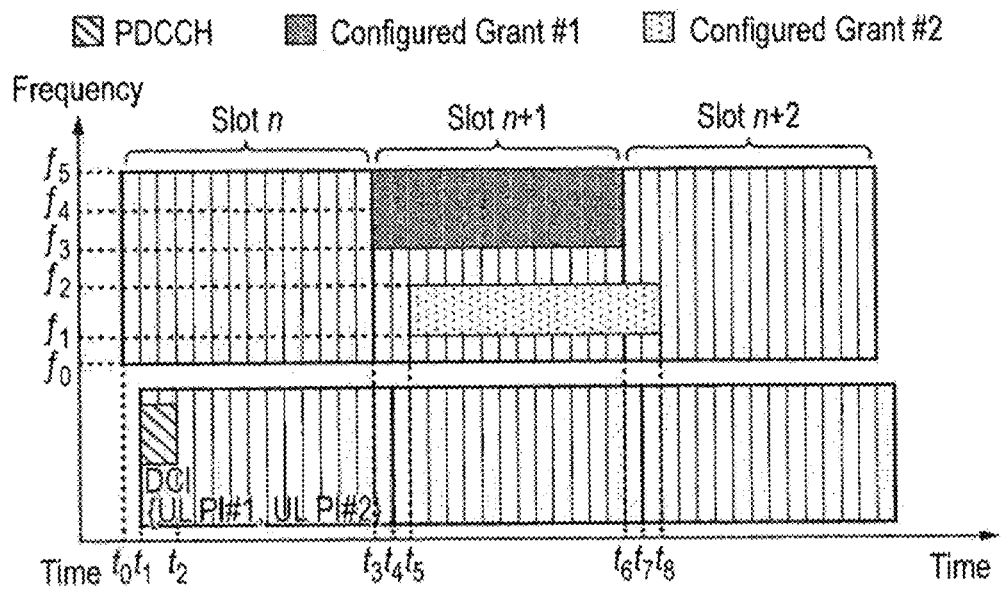
FIG. 12 illustrates an example of how a DCI may be configured with multiple uplink pre-emption indicators in accordance with embodiments of the present technique.

An example is shown in FIG. 12, the said DCI can be configured with 2 UL PIs. i.e. {UL PI #1. UL PI #2} where UL PI #1 is associated with Configured Grant #1 (occupying frequency $f_3$ to $f_5$ and duration of 1 slot) and UL PI #2 is associated with Configured Grant #2 (occupying frequency $f_1$ to $f_2$ and duration of 1 slot with 2 symbols offset from beginning of the slot). Each UL PI consists of 14 bits bitmap (i.e. the DCI size is 14×2=28 bits). UL PI #1's bitmap represents 2×7 grid and UL PI #2's bitmap represents a 1×14 grid. For a UE with multiple configured grants, it need only monitor a single DCI. And for the case where the multiple configured grants are for multiple UEs only a single DCI needs to be sent for all these UEs. It should be appreciated by those skilled in the art that this example has only 2 UL PIs in a DCI and other number of UL PIs can be configured for the DCI. Also the UL PIs may all share the same grid layout but here we show that it can have different grid layout.

In another arrangement of embodiments of the present technique, when the UL PI targets a dynamic grant PUSCH (i.e. a PUSCH scheduled by a DCI) the reference region in the frequency domain is the active Bandwidth Part (BWP) where the pre-empted PUSCH (i.e. for the eMBB UE) is. In other words, a contiguous range of frequencies which define the communications resources of the reference region are the same as a contiguous range of frequencies which define a bandwidth part of the wireless access interface comprising the uplink communications resources allocated by the uplink grant, the bandwidth part being smaller than and within a system bandwidth of the wireless access interface.

In another arrangement of embodiments of the present technique, when the UL PI targets a dynamic grant PUSCH (i.e. a PUSCH scheduled by a DCI) the reference region in the time domain is the periodicity of the UL PI. In other words, a continuous time period which defines the communications resources of the reference region is the same as a continuous time period between periodic uplink pre-emption indicator monitoring occasions of the wireless access interface within which the communications device monitors for an uplink pre-emption indicator from the infrastructure equipment. Here, as with the above described arrangements where the UL PI targets a configured grant PUSCH, each of the uplink pre-emption indicator monitoring occasions are located at the start of the reference region associated with the uplink pre-emption indicator that the communications device monitors for in that uplink pre-emption indicator monitoring occasion, or each of the uplink pre-emption indicator monitoring occasions are located before the start of the reference region associated with the uplink pre-emption indicator that the communications device monitors for in that uplink pre-emption indicator monitoring occasion.

In another arrangement of embodiments of the present technique, when the UL PI targets a dynamic grant PUSCH (i.e. a PUSCH scheduled by a DCI) the reference region is the resources occupied by the scheduled PUSCH. This is applicable where the UL PI is UE specific. In other words, the communications resources of the reference region are the same as the uplink communications resources allocated by the uplink grant.

In another arrangement of embodiments of the present technique, when a UE receives an UL PI, whether the UL PI targets dynamic grant or configured grant may be recognised by the UE using one or more of a plurality of specific methods, described below:
Different RNTI used for PDCCH conveying the UL PI:
  First RNTI is used for dynamic grant, and second RNTI is used for configured grant;
  In this example, DCI format and DCI payload size are the same among dynamic grant and configured grant:
Different DCI format:
Different CORESET:
Different search space:
An explicit indicator in the DCI indicating the target reference region:
Whether RRC parameters for configured grant are configured or not:
  When the parameters are not configured, the UL PI is always recognised as being related to dynamic grant;
  Otherwise, the UL PI is recognised based on another rule:
Whether eMBB PUSCH (i.e. PUSCH mapping type A) is dynamically granted in the corresponding reference region:
  When eMBB PUSCH (i.e. PUSCH mapping type A) is not dynamically granted in the corresponding reference region, the UL PI is always recognised as being related to configured grant;
  Otherwise, the UL PI is recognised based on another rule.

In other words, the communications device is configured to determine the communications resources of the reference region dependent on one or more of: an identifier used for a control channel received from the infrastructure equipment, the control channel comprising the uplink pre-emption indicator: a format of downlink control information received from the infrastructure equipment, the downlink control information comprising the uplink pre-emption indicator: one or more communications parameters of a control and resource set, CORESET, received from the infrastructure equipment, the CORESET comprising communications resources for the uplink pre-emption indicator: communications resources defining a search space which the communications device is instructed by the infrastructure equipment to monitor for the uplink pre-emption indicator: a received indication (from the infrastructure equipment) of the communications resources of the reference region: whether or not one or more radio resource control, RRC, parameters are configured in the case the communications device is configured to determine that the uplink communications resources are pre-configured for use by the communications device for the transmission of the data: or whether the uplink communications resources are within the communications resources of the reference region in the case the communications device is configured to receive an uplink grant comprising an allocation of the uplink communications resources from the infrastructure equipment.

Flow Diagram Representation

Figure 13:
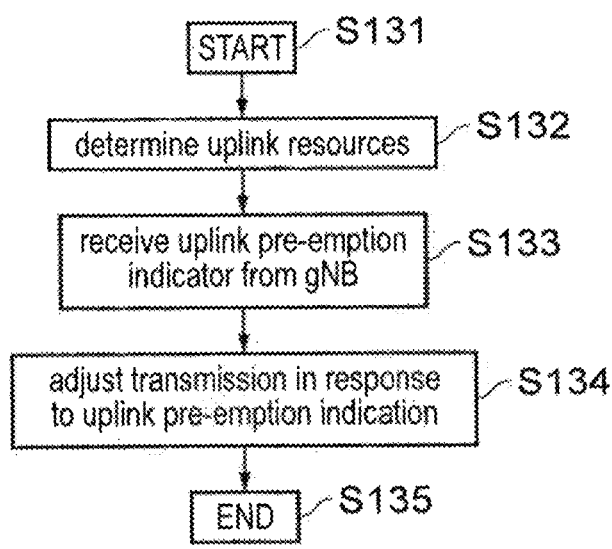
FIG. 13 shows a flow diagram illustrating a process of communications between a communications device and an infrastructure equipment in accordance with embodiments of the present technique.

FIG. 13 shows a flow diagram illustrating a method of operating a communications device for transmitting data to an infrastructure equipment of a wireless communications network. The method begins in step S131. The method comprises, in step S132, determining uplink communications resources of a wireless access interface provided by the wireless communications network to be used for the transmission of data by the communications device to the infrastructure equipment. The process then comprises in step S133, receiving, from the infrastructure equipment via the wireless radio interface, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator. In step S134, the method comprises adjusting one or more communications parameters for the transmission of signals representing the data in the uplink communications resources in response to receiving the uplink pre-emption indicator. The process ends in step S135.

Those skilled in the art would appreciate that the method shown by FIG. 13 may be adapted in accordance with embodiments of the present technique. For example, other preliminary, intermediate, or subsequent steps as described herein may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device for transmitting data to or receiving data from an infrastructure equipment forming part of a wireless communications network, the method comprising:
  determining uplink communications resources of a wireless access interface provided by the wireless communications network to be used for the transmission of data by the communications device to the infrastructure equipment,
  receiving, from the infrastructure equipment via the wireless radio interface, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator, and
  adjusting one or more communications parameters for the transmission of signals representing the data in the uplink communications resources in response to receiving the uplink pre-emption indicator.

Paragraph 2. A method according to Paragraph 1, comprising
  determining the communications resources of the reference region of the uplink pre-emption indicator based on a manner in which the uplink communications resources are allocated to the communications device.

Paragraph 3. A method according to Paragraph 2, wherein the manner in which the uplink communications resources are allocated to the communications device comprises determining that the uplink communications resources are pre-configured for use by the communications device for the transmission of the data.

Paragraph 4. A method according to Paragraph 2, wherein the manner in which the uplink communications resources are allocated to the communications device comprises receiving an uplink grant comprising an allocation of the uplink communications resources from the infrastructure equipment.

Paragraph 5. A method according to any of Paragraphs 1 to 4, wherein the uplink pre-emption indicator comprises a bitmap comprising one or more bits each representing a portion of the communications resources of the reference region, wherein a value of each of the one or more bits indicates whether or not the portion of the communications resources of the reference region associated with that bit is within the at least the portion of the uplink communications resources that are allocated for the transmission of signals by the other communications device.

Paragraph 6. A method according to any of Paragraphs 1 to 5, wherein the uplink pre-emption indicator comprises a bitmap comprising a single bit representing all of the communications resources of the reference region, wherein a value of the single bit indicates whether or not the at least the portion of the uplink communications resources that are allocated for the transmission of signals by the other communications device is within the communications resources of the reference region.

Paragraph 7. A method according to any of Paragraphs 1 to 6, comprising
  determining that the uplink communications resources are pre-configured for use by the communications device for the transmission of the data.

Paragraph 8. A method according to Paragraph 7, wherein the adjusting one or more communications parameters comprises only transmitting the signals representing the data in the uplink communications resources other than the at least the portion of the uplink communications resources.

Paragraph 9. A method according to Paragraph 7 or Paragraph 8, wherein the adjusting one or more communications parameters comprises increasing a transmission power for transmitting the signals representing the data in the at least the portion of the uplink communications resources.

Paragraph 10. A method according to any of Paragraphs 7 to 9, wherein a contiguous range of frequencies which define the communications resources of the reference region are the same as a contiguous range of frequencies which define the uplink communications resources.

Paragraph 11. A method according to any of Paragraphs 7 to 10, wherein a continuous time period which defines the communications resources of the reference region is the same as a continuous time period between periodic uplink pre-emption indicator monitoring occasions of the wireless access interface within which the communications device monitors for an uplink pre-emption indicator from the infrastructure equipment.

Paragraph 12. A method according to Paragraph 11, wherein each of the uplink pre-emption indicator monitoring occasions are located at the start of the reference region associated with the uplink pre-emption indicator that the communications device monitors for in that uplink pre-emption indicator monitoring occasion.

Paragraph 13. A method according to Paragraph 11, wherein each of the uplink pre-emption indicator monitoring occasions are located before the start of the reference region associated with the uplink pre-emption indicator that the communications device monitors for in that uplink pre-emption indicator monitoring occasion.

Paragraph 14. A method according to any of Paragraphs 7 to 13, wherein a continuous time period which defines the communications resources of the reference region is the same as a continuous time period which defines the uplink communications resources.

Paragraph 15. A method according to any of Paragraphs 7 to 14, comprising
receiving the uplink pre-emption indicator in downlink control information received from the infrastructure equipment, the downlink control information comprising one or more other uplink pre-emption indicators.

Paragraph 16. A method according to Paragraph 15, wherein the downlink control information is transmitted to one or more other communications devices in addition to the communications device, and each of the other uplink pre-emption indicators are for receipt by one of the other communications devices.

Paragraph 17. A method according to Paragraph 15 or Paragraph 16, wherein one or more of the other uplink pre-emption indicators are for receipt by the communications device and each of the one or more of the other uplink pre-emption indicators indicate that at least a portion of the uplink communications resources are allocated for the transmission of a signal by one of one or more other communications devices, the at least the portion of the uplink communications resources being located within communications resources of a reference region associated with each of the one or more of the other uplink pre-emption indicators.

Paragraph 18. A method according to any of Paragraphs 1 to 17, wherein the manner in which the uplink communications resources are allocated to the communications device comprises receiving an uplink grant comprising an allocation of the uplink communications resources from the infrastructure equipment.

Paragraph 19. A method according to Paragraph 18, wherein the adjusting one or more communications parameters comprises only transmitting the signals representing the data in the uplink communications resources other than the at least the portion of the uplink communications resources.

Paragraph 20. A method according to Paragraph 18 or Paragraph 19, wherein the adjusting one or more communications parameters comprises cancelling the transmission of the signals representing the data in the uplink communications resources.

Paragraph 21. A method according to Paragraph 20, comprising, subsequent to cancelling the transmission of the signals representing the data in the uplink communications resources,
receiving a second uplink grant from the infrastructure equipment comprising an allocation of new uplink communications resources of the wireless access interface to be used for the transmission of the data.

Paragraph 22. A method according to any of Paragraphs 18 to 21, wherein a contiguous range of frequencies which define the communications resources of the reference region are the same as a contiguous range of frequencies which define a bandwidth part of the wireless access interface comprising the uplink communications resources allocated by the uplink grant, the bandwidth part being smaller than and within a system bandwidth of the wireless access interface.

Paragraph 23. A method according to any of Paragraphs 18 to 22, wherein a continuous time period which defines the communications resources of the reference region is the same as a continuous time period between periodic uplink pre-emption indicator monitoring occasions of the wireless access interface within which the communications device monitors for an uplink pre-emption indicator from the infrastructure equipment.

Paragraph 24. A method according to Paragraph 23, wherein each of the uplink pre-emption indicator monitoring occasions are located at the start of the reference region associated with the uplink pre-emption indicator that the communications device monitors for in that uplink pre-emption indicator monitoring occasion.

Paragraph 25. A method according to Paragraph 23, wherein each of the uplink pre-emption indicator monitoring occasions are located before the start of the reference region associated with the uplink pre-emption indicator that the communications device monitors for in that uplink pre-emption indicator monitoring occasion.

Paragraph 26. A method according to any of Paragraphs 18 to 25, wherein the communications resources of the reference region are the same as the uplink communications resources allocated by the uplink grant.

Paragraph 27. A method according to any of Paragraphs 1 to 26, comprising
determining the communications resources of the reference region dependent on an identifier used for a control channel received from the infrastructure equipment, the control channel comprising the uplink pre-emption indicator.

Paragraph 28. A method according to any of Paragraphs 1 to 27, comprising
determining the communications resources of the reference region dependent on a format of downlink control information received from the infrastructure equipment, the downlink control information comprising the uplink pre-emption indicator.

Paragraph 29. A method according to any of Paragraphs 1 to 28, comprising
determining the communications resources of the reference region dependent on one or more communications parameters of a control resource set, CORESET, received from the infrastructure equipment, the CORESET comprising communications resources for the uplink pre-emption indicator.

Paragraph 30. A method according to any of Paragraphs 1 to 29, comprising
determining the communications resources of the reference region dependent on communications resources defining a search space which the communications device is instructed by the infrastructure equipment to monitor for the uplink pre-emption indicator.

Paragraph 31. A method according to any of Paragraphs 1 to 30, comprising
receiving, from the infrastructure equipment, an indication of the communications resources of the reference region, and determining the communications resources of the reference region dependent on the received indication.

Paragraph 32. A method according to any of Paragraphs 1 to 31, comprising
determining the communications resources of the reference region dependent on whether or not one or more radio resource control, RRC, parameters are configured in the case that the manner in which the uplink communications resources are allocated to the communications device comprises determining that the uplink communications resources are pre-configured for use by the communications device for the transmission of the data.

Paragraph 33. A method according to any of Paragraphs 1 to 32, comprising
determining the communications resources of the reference region dependent on whether the uplink communications resources are within the communications resources of the reference region in the case that the manner in which the uplink communications resources are allocated to the communications device comprises receiving an uplink grant comprising an allocation of the uplink communications resources from the infrastructure equipment.

Paragraph 34. A communications device for transmitting data to or receiving data from an infrastructure equipment forming part of a wireless communications network, the communications device comprising
transmitter circuitry configured to transmit signals to the infrastructure equipment via a wireless access interface provided by the wireless communications network,
receiver circuitry configured to receive signals from the infrastructure equipment via the wireless access interface, and
controller circuitry configured in combination with the receiver circuitry and the transmitter circuitry
to determine uplink communications resources of the wireless access interface to be used for the transmission of data by the communications device to the infrastructure equipment,
to receive, from the infrastructure equipment via the wireless radio interface, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator, and
to adjust one or more communications parameters for the transmission of signals representing the data in the uplink communications resources in response to receiving the uplink pre-emption indicator.

Paragraph 35. Circuitry for a communications device for transmitting data to or receiving data from an infrastructure equipment forming part of a wireless communications network, the communications device comprising
transmitter circuitry configured to transmit signals to the infrastructure equipment via a wireless access interface provided by the wireless communications network,
receiver circuitry configured to receive signals from the infrastructure equipment via the wireless access interface, and
controller circuitry configured in combination with the receiver circuitry and the transmitter circuitry
to determine uplink communications resources of the wireless access interface to be used for the transmission of data by the communications device to the infrastructure equipment,
to receive, from the infrastructure equipment via the wireless radio interface, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator, and
to adjust one or more communications parameters for the transmission of signals representing the data in the uplink communications resources in response to receiving the uplink pre-emption indicator.

Paragraph 36. A method of operating an infrastructure equipment forming part of a wireless communications network for transmitting data to or receiving data from a communications device, the method comprising:
transmitting, to the communications device via a wireless radio interface provided by the wireless communications network, an uplink pre-emption indicator that indicates that at least a portion of uplink communications resources to be used for the transmission of data by the communications device to the infrastructure equipment are allocated for the transmission of signals by another communications device, the at least the portion of the uplink communications resources being located within communications resources of a reference region associated with the uplink pre-emption indicator,
wherein the uplink pre-emption indicator is transmitted to the communications device for use in adjusting one or more communications parameters for the transmission of signals representing the data in the uplink communications resources.

Paragraph 37. An infrastructure equipment forming part of a wireless communications network for transmitting data to or receiving data from a communications device, the infrastructure equipment comprising
transmitter circuitry configured to transmit signals to the communications device via a wireless access interface provided by the wireless communications network,
receiver circuitry configured to receive signals from the communications device via the wireless access interface, and
controller circuitry configured in combination with the transmitter circuitry
to transmit, to the communications device via a wireless radio interface provided by the wireless communications network, an uplink pre-emption indicator that indicates that at least a portion of uplink communications resources to be used for the transmission of data by the communications device to the infrastructure equipment are allocated for the transmission of signals by another communications device, the at least the portion of the uplink communications resources being located within communications resources of a reference region associated with the uplink pre-emption indicator,
wherein the uplink pre-emption indicator is transmitted to the communications device for use in adjusting one or more communications parameters for the transmission of signals representing the data in the uplink communications resources.

Paragraph 38. Circuitry for an infrastructure equipment forming part of a wireless communications network for transmitting data to or receiving data from a communications device, the infrastructure equipment comprising
transmitter circuitry configured to transmit signals to the communications device via a wireless access interface provided by the wireless communications network,
receiver circuitry configured to receive signals from the communications device via the wireless access interface, and
controller circuitry configured in combination with the transmitter circuitry
to transmit, to the communications device via a wireless radio interface provided by the wireless communications network, an uplink pre-emption indicator that indicates that at least a portion of uplink communications resources to be used for the transmission of data by the communications device to the infrastructure equipment are allocated for the transmission of signals by another communications device, the at least the portion of the uplink communications resources being located within communications resources of a reference region associated with the uplink pre-emption indicator, wherein the uplink pre-emption indicator is transmitted to the communications device for use in adjusting one or more communications parameters for the transmission of signals representing the data in the uplink communications resources.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS 38.300 v. 15.2.0 "NR; NR and NG-RAN Overall Description; Stage 2 (Release 15)", 3$^{rd}$ Generation Partnership Project, June 2018.
[2] Holma H. and Toskala A, "LTE for UMTS OFDMA and SC-FDMA based radio access", John Wiley and Sons, 2009.
[3] 3GPP TR 38.824, "Study on physical layer enhancements for NR ultra-reliable and low latency case (URLLC) (Rel-16)", v1.2.0, 3$^{rd}$ Generation Partnership Project, March 2019.
[4] RP-182089, "Study on physical layer enhancements for NR ultra-reliable and low latency case (URLLC)," Huawei, HiSilicon, Nokia, Nokia Shanghai Bell, RAN #81, September 2018.
[5] European Patent Application no. EP16189083.5.
[6] 3GPP TS 38.212, "Multiplexing and channel coding (Release 15)" 3rd Generation Partnership Project, November 2018.
[7] European Patent Application no. EP17176495.4.
[8] R1-1808344, "UL Inter-UE Pre-emption," Sony, RAN1 #94, August 2018.

What is claimed is:

1. Circuitry for a communications device for transmitting data to or receiving data from an infrastructure equipment forming part of a wireless communications network, the communications device comprising:

transmitter circuitry configured to transmit signals to the infrastructure equipment via a wireless access interface provided by the wireless communications network, receiver circuitry configured to receive signals from the infrastructure equipment via the wireless access interface, and controller circuitry configured in combination with the receiver circuitry and the transmitter circuitry to determine uplink communications resources of the wireless access interface to be used for the transmission of data by the communications device to the infrastructure equipment, to receive, from the infrastructure equipment via the wireless radio interface, an uplink pre-emption indicator that indicates that at least a portion of the uplink communications resources are allocated for the transmission of signals by another communications device, the at least the portion of the uplink communications resources being located within communications resources of a reference region associated with the uplink pre-emption indicator, and to adjust one or more communications parameters for the transmission of signals representing the data in the uplink communications resources in response to receiving the uplink pre-emption indicator, the adjustment of the one or more communications parameters being based on a manner in which the uplink communications resources were allocated.

2. An infrastructure equipment forming part of a wireless communications network for transmitting data to or receiving data from a communications device, the infrastructure equipment comprising:

transmitter circuitry configured to transmit signals to the communications device via a wireless access interface provided by the wireless communications network, receiver circuitry configured to receive signals from the communications device via the wireless access interface, and controller circuitry configured in combination with the transmitter circuitry to transmit, to the communications device via a wireless radio interface provided by the wireless communications network, an uplink pre-emption indicator that indicates that at least a portion of uplink communications resources to be used for the transmission of data by the communications device to the infrastructure equipment are allocated for the transmission of signals by another communications device, the at least the portion of the uplink communications resources being located within communications resources of a reference region associated with the uplink pre-emption indicator, wherein the uplink pre-emption indicator is transmitted to the communications device for use in adjusting one or more communications parameters for the transmission of signals representing the data in the uplink communications resources, the adjustment of the one or more communications parameters being based on a manner in which the uplink communications resources were allocated.

3. The infrastructure equipment according to claim 2, wherein the controller circuitry is further configured to determine the communications resources of the reference region of the uplink pre-emption indicator based on the manner in which the uplink communications resources are allocated to the communications device.

4. The infrastructure equipment according to claim 3, wherein the manner in which the uplink communications resources are allocated to the communications device including determining that the uplink communications resources are pre-configured for use by the communications device for the transmission of the data.

5. The infrastructure equipment according to claim 3, wherein the manner in which the uplink communications resources are allocated to the communications device include an uplink grant comprising an allocation of the uplink communications resources from the infrastructure equipment.

6. The infrastructure equipment according to claim 2, wherein the uplink pre-emption indicator comprises a bitmap comprising one or more bits each representing a portion of the communications resources of the reference region,
wherein a value of each of the one or more bits indicates whether or not the portion of the communications resources of the reference region associated with that bit is within the at least the portion of the uplink communications resources that are allocated for the transmission of signals by the other communications device.

7. The infrastructure equipment according to claim 2, wherein the uplink pre-emption indicator comprises a bitmap comprising a single bit representing all of the communications resources of the reference region,
wherein a value of the single bit indicates whether or not the at least the portion of the uplink communications resources that are allocated for the transmission of signals by the other communications device is within the communications resources of the reference region.

8. The infrastructure equipment according to claim 2, wherein the controller circuitry is further configured to determine that the uplink communications resources are pre-configured for use by the communications device for the transmission of the data.

9. The infrastructure equipment according to claim 2, wherein a contiguous range of frequencies which define the communications resources of the reference region are the same as a contiguous range of frequencies which define the uplink communications resources.

10. The infrastructure equipment according to claim 2, wherein a continuous time period which defines the communications resources of the reference region is the same as a continuous time period between periodic uplink pre-emption indicator monitoring occasions of the wireless access interface within which the communications device monitors for an uplink pre-emption indicator from the infrastructure equipment.

11. The infrastructure equipment according to claim 2, wherein a continuous time period which defines the communications resources of the reference region is the same as a continuous time period which defines the uplink communications resources.

12. The infrastructure equipment according to claim 2, wherein the controller circuitry is further configured to, in conjunction with the transmitter circuitry, transmit the uplink pre-emption indicator in downlink control information, the downlink control information including one or more other uplink pre-emption indicators.

13. The infrastructure equipment according to claim 12, wherein the controller circuitry is further configured to, in conjunction with the transmitter circuitry, transmit the downlink control information to one or more other communications devices in addition to the communications device, and each of the other uplink pre-emption indicators are for receipt by one of the other communications devices.

14. The infrastructure equipment according to claim 13, wherein one or more of the other uplink pre-emption indicators are for receipt by the communications device and each of the one or more of the other uplink pre-emption indicators indicate that at least a portion of the uplink communications resources are allocated for the transmission of a signal by one of one or more other communications devices, the at least the portion of the uplink communications resources being located within communications resources of a reference region associated with each of the one or more of the other uplink pre-emption indicators.

15. The infrastructure equipment according to claim 2, wherein the controller circuitry is further configured to indicate, in conjunction with the transmitter circuitry, the communications resources of the reference region with an identifier used for a control channel from the infrastructure equipment, the control channel including the uplink pre-emption indicator.

16. The infrastructure equipment according to claim 2, wherein the controller circuitry is further configured to, in conjunction with the transmitter circuitry, indicate the communications resources of the reference region via a format of downlink control information to, the downlink control information including the uplink pre-emption indicator.

17. The infrastructure equipment according to claim 2, wherein the controller circuitry is further configured to indicate, in conjunction with the transmitter circuitry, the communications resources of the reference region via one or more communications parameters of a control resource set (CORESET), the CORESET comprising communications resources for the uplink pre-emption indicator.

18. The infrastructure equipment according to claim 2, wherein the controller circuitry is further configured to, in conjunction with the transmitter circuitry, indicate the communications resources of the reference region via communications resources defining a search space which the communications device is instructed by the infrastructure equipment to monitor for the uplink pre-emption indicator.

19. The infrastructure equipment according to claim 2, wherein the controller circuitry is further configured to, in conjunction with the transmitter circuitry, indicate the communications resources of the reference region via configuration of one or more radio resource control (RRC) parameters.

20. Circuitry for an infrastructure equipment forming part of a wireless communications network for transmitting data to or receiving data from a communications device, the infrastructure equipment comprising:
transmitter circuitry configured to transmit signals to the communications device via a wireless access interface provided by the wireless communications network,
receiver circuitry configured to receive signals from the communications device via the wireless access interface, and
controller circuitry configured in combination with the transmitter circuitry to transmit, to the communications device via a wireless radio interface provided by the wireless communications network, an uplink pre-emption indicator that indicates that at least a portion of uplink communications resources to be used for the transmission of data by the communications device to the infrastructure equipment are allocated for the transmission of signals by another communications device, the at least the portion of the uplink communications resources being located within communications resources of a reference region associated with the uplink pre-emption indicator, wherein the uplink pre-emption indicator is transmitted to the communications device for use in adjusting one or more communications parameters for the transmission of signals representing the data in the uplink communications resources, the adjustment of the one or more communications parameters being based on a manner in which the uplink communications resources were allocated.

\* \* \* \* \*